S. MOORE.
Thrashing Machine.
No. 11,761.
Patented Oct. 3, 1854.
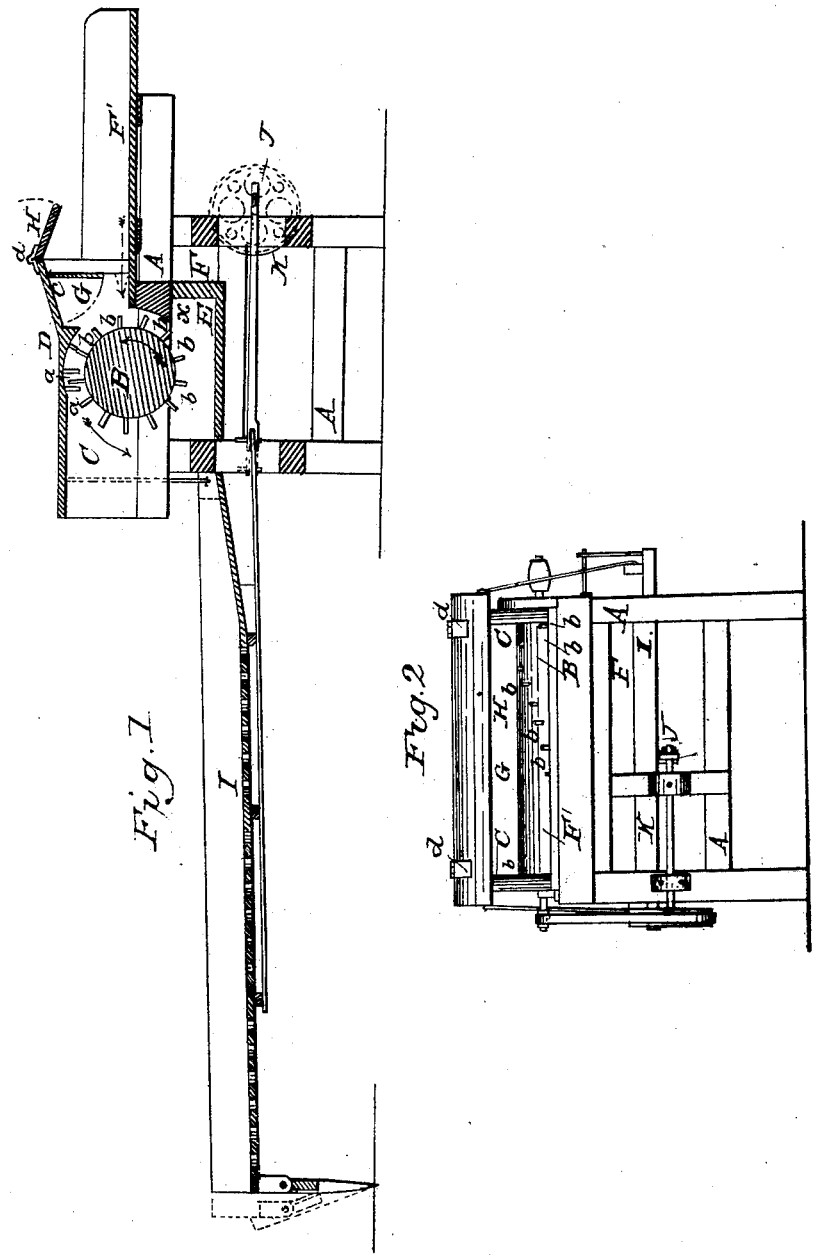

UNITED STATES PATENT OFFICE.

SPENCER MOORE, OF CENTRAL BRIDGE, NEW YORK.

FEEDING HOPPER OF THRESHERS AND SEPARATORS OF GRAIN.

Specification forming part of Letters Patent No. 11,761, dated October 3, 1854; Reissued December 18, 1860, No. 1,099.

*To all whom it may concern:*

Be it known that I, SPENCER MOORE, of Central Bridge, in the county of Schoharie and State of New York, have invented a new and useful Improvement in Threshing-Machines; and I do hereby declare that the following is a full, clear, and exact description of the same, reference being had to the annexed drawings, making a part of this specification, in which—

Figure 1, is a longitudinal vertical section of my improved threshing machine. Fig. 2, is an end view of ditto.

Similar letters of reference indicate corresponding parts in the two figures.

The nature of my invention consists in the employment or use of grain and dust arresters, arranged in such a manner as will be hereafter shown, to prevent the dust and grain from passing upward in the face of the operator or feeder, the arresters causing the dust and all the grain to pass through the machine.

To enable others skilled in the art to fully understand and construct my invention, I will proceed to describe it.

A, represents a rectangular frame, having upon its upper part, a threshing cylinder, B, which is placed transversely upon the frame, and constructed in the usual manner.

C, is a box placed on the upper part of the frame, A; said box covering the threshing cylinder, and having a concave, D, at its upper part directly over the threshing cylinder. The concave, D, is provided with teeth, (*a*), and the threshing cylinder is also provided with teeth, (*b*), the teeth of the concave and cylinder being so arranged that the teeth, (*b*), of the cylinder, as it rotates, will pass between the teeth, (*a*), of the concave, see Fig. 1.

E, is a floor or platform placed in the frame, A, underneath the threshing cylinder, B. A partition or back, F, is attached to the back end of the floor or platform, and it reaches to the upper part of the frame, as shown clearly in Fig. 1, having a shoulder, *x*, at the back part of the floor or platform, to prevent the dust from ascending upward around the threshing cylinder.

F′, is a feed board on the upper part of the frame, A, and directly behind the threshing cylinder, B.

G, is a flap, or swinging blind, attached by pivots, (*c*), see Fig. 1, to the sides of the box, C, at its outer end, or at the part of the machine commonly termed the "throat." The flag or swinging blind opens inward as indicated by the dotted lines in Fig. 1. It cannot open outward, owing to the position of the pivots, (*c*), and the inclination of the top of the box, C, directly above the flap or blind.

H, is a guard board attached by hinges, (*d*), (*d*), to the outer end of the top of the box, C. This guard board is somewhat inclined in a downward direction from the top of the box, C, and may be elevated as shown by the dotted lines in Fig. 1.

I, is a screen placed at the end of the machine, and receiving motion from a crank, J, which is on the end of a shaft, K, at one end of the frame, A.

The grain to be threshed is placed upon the feed board, F′, by an operator or feeder, and passes between the cylinder, B, and concave, D, and falls upon the screen, I, see arrows, Fig. 1. The dust is prevented from passing out of the throat of the machine, in consequence of the flap or swinging blind, G, the lower end of which rests upon the grain and straw, and keeps the throat closed. The dust, therefore, passes through the machine with the grain and straw. The flap, or swinging frame, by opening inward, allows a small or large amount of grain to pass into the machine; that is, the layer of grain and straw upon the feed board, may vary in thickness, and the lower end of the flap or swinging blind, will, by its own gravity, rest upon the layer, and keep the throat closed.

The guard board, H, prevents the grain from being thrown or scattered from the feed board. The object of the hinges, (*d*), (*d*), is to allow the guard board to be raised at any time, and prevent the straw from clogging or choking in the throat.

I do not claim the cylinder and concave, for they have been previously used; but—

What I claim as new, and desire to secure by Letters Patent, is:—

The employment, or use, of the flap, or swing blind, G, guard board, H, and shoulder, *x*, arranged in the manner and for the purpose, as herein shown and described.

SPENCER MOORE.

Witnesses:
GEORGE WESTINGHOUSE,
STEPHEN CAMPBELL.

[FIRST PRINTED 1913.]